United States Patent
Hoshida (10) Patent No.: US 7,254,325 B2
(45) Date of Patent: Aug. 7, 2007

(54) METHOD AND SYSTEM FOR OPTICAL PERFORMANCE MONITORING

(75) Inventor: Takeshi Hoshida, Richardson, TX (US)

(73) Assignee: Fujitsu Limited, Kawasaki (JP)

( * ) Notice: Subject to any disclaimer, the term of this patent is extended or adjusted under 35 U.S.C. 154(b) by 724 days.

(21) Appl. No.: 10/430,881

(22) Filed: May 6, 2003

(65) Prior Publication Data

US 2004/0223769 A1  Nov. 11, 2004

(51) Int. Cl.
*H04B 10/00* (2006.01)
(52) U.S. Cl. ............................ 398/25; 398/9
(58) Field of Classification Search ............... 398/192, 398/186, 183, 151, 276, 9–38, 188, 202–214
See application file for complete search history.

(56) References Cited

U.S. PATENT DOCUMENTS

| | | | |
|---|---|---|---|
| 5,296,956 A | 3/1994 | Fatehi et al. | 359/110 |
| 5,513,029 A | 4/1996 | Roberts | 359/177 |
| 5,657,154 A | 8/1997 | Yoneyama | 359/341 |
| 5,767,995 A * | 6/1998 | Rainal et al. | 398/192 |
| 5,790,285 A | 8/1998 | Mock | 359/110 |
| 5,949,560 A | 9/1999 | Roberts et al. | 359/110 |
| 6,160,649 A * | 12/2000 | Horiuchi et al. | 398/34 |
| 6,310,703 B1 | 10/2001 | Alavie et al. | 359/110 |
| 6,317,231 B1 | 11/2001 | Al-Salameh et al. | 359/110 |
| 6,323,978 B1 | 11/2001 | Harley et al. | 359/154 |
| 6,344,910 B1 | 2/2002 | Cao | 359/110 |
| 6,587,242 B1 * | 7/2003 | Shake et al. | 398/98 |
| 6,807,245 B2 * | 10/2004 | Ibukuro et al. | 375/376 |
| 6,959,152 B2 * | 10/2005 | Fujiwara et al. | 398/81 |
| 2002/0154372 A1 * | 10/2002 | Chung et al. | 359/182 |
| 2003/0002112 A1 * | 1/2003 | Hirano et al. | 359/161 |
| 2003/0198478 A1 * | 10/2003 | Vrazel et al. | 398/183 |
| 2004/0101300 A1 * | 5/2004 | Bialas et al. | 398/26 |
| 2004/0208525 A1 * | 10/2004 | Seydnejad et al. | 398/33 |

FOREIGN PATENT DOCUMENTS

JP  05153050 A  *  6/1993

OTHER PUBLICATIONS

PCT Notification Transmittal of the International Search Report and the Written Opinion of the International Searching Authority, or the Declaration mailed Dec. 8, 2004, re PCT/US2004/013391 filed Apr. 29, 2004 (10 pages).
Hoshida, et al., *Optimal 40 Gb/s Modulation Formats for Spectrally Efficient Long-Haul DWDM Systems*, Journal of Lightwave Technology, Vo. 20, No. 12, Dec. 2002 (8 pages).
T. Miyano, M. Fukutoku, K. Hattori, and H. Ono, "*Suppression of degradation induced by SPM/XPM+GVD in WDM transmission using a bit-synchronous intensity modulated DPSK signa*"l; Fifth Optoelectronics and Communications Conference (OECC 2000) 14D3-3; Technical Digest; 2 pages, Jul. 2000.
Shoko Ohteru and Noboru Takachio; "*Optical Signal Quality Monitor Using Direct Q-Factor Measurement*"; IEEE Photonics Technology Letters, vol. 11, p. 1307-09, Oct. 1999.

* cited by examiner

*Primary Examiner*—Agustin Bello
(74) *Attorney, Agent, or Firm*—Baker Botts L.L.P.

(57) ABSTRACT

In accordance with one embodiment of the present invention, a system for monitoring a performance characteristic of an intensity modulated phase shift keying optical signal includes a splitter, a first detector, and a second detector. The splitter is operable to receive an intensity modulated phase shift keying optical signal from an optical network and route at least a portion of the signal to the first detector. The first detector generates an electrical signal based on the received optical signal without demodulating the optical signal. The second detector measures a performance characteristic of the intensity modulated phase shift keying optical signal based on a signal indicative of the filtered signal.

30 Claims, 4 Drawing Sheets

METHOD AND SYSTEM FOR OPTICAL PERFORMANCE MONITORING

TECHNICAL FIELD

The present invention relates generally to optical communication systems, and more particularly to a method and system for optical performance monitoring.

BACKGROUND

Telecommunications systems, cable television systems and data communication networks use optical networks to rapidly convey large amounts of information between remote points. In an optical network, information is conveyed in the form of optical signals through optical fibers. Optical fibers are thin strands of glass capable of transmitting the signals over long distances with very low loss.

In an optical network, laser light is modulated to represent digital data. Intensity-modulated Phase-shift Keying (IM-mPSK) modulation is one type of modulation that involves shifting the phase of the output waveform to one of a fixed number of states. Three common versions are intensity-modulated binary, or BPSK, quadrature, or QPSK, and 8Ø-PSK, corresponding to two, four and eight states, respectively. IM-mPSK is described in T. Miyano, M. Fukutoku, K. Hattori, and H. Ono, "Suppression of degradation induced by SPM/XPM+GVD in WDM transmission using bit-synchronous intensity modulated DPSK," in Proceedings of OECC '00, 14D3, 2000; A. H. Gnauck et al., "2.5 Tb/s (64×42.7 Gb/s) transmission over 40×100 km NZDSF using RZ-DPSK format and all-Raman amplified spans," in Proceedings of OFC'02, FC2-1, 2002; O. Vassilieva et al., "Numerical comparison of NRZ, CS-RZ and IM-DPSK formats in 43 Gbit/s WDM transmission," in Proceedings of LEOS 2001, ThC2, pp. 673-674, 2001; and C. Wree et al., in Proceedings of ECOC 2002, paper 9.6.6, 2002.

Optical networks often employ wavelength division multiplexing (WDM) or dense wavelength division multiplexing (DWDM) to increase transmission capacity. In WDM and DWDM networks, a number of optical channels are carried in each fiber at disparate wavelengths. Network capacity is increased as a multiple of the number of wavelengths, or channels, in each fiber.

The maximum distance that a signal can be transmitted in a WDM or other optical network without amplification is limited by absorption, scattering and other loss associated with the optical fiber. To transmit signals over long distances, optical networks typically include a number of discrete amplifiers spaced along each fiber route. The discrete amplifiers boost received signals to compensate for transmission losses in the fiber.

Optical signals may experience degradation due to fiber cuts, signal attenuation, fiber deterioration, excess noise, temporal deviation of fiber dispersion, or other causes. Providing reliable communication in an optical network requires maintaining signal quality, often measured by bit error rate (BER). Thus, the BER of an optical signal, or an approximation thereof, is useful in monitoring the quality of the optical signal.

SUMMARY

The present invention provides a method and system for optical performance monitoring. In accordance with one embodiment of the present invention, a system for monitoring a performance characteristic of an intensity modulated phase shift keying optical signal includes a splitter, a first detector, and a second detector. The splitter is operable to receive an intensity modulated phase shift keying optical signal from an optical network and route at least a portion of the signal to the first detector. The first detector generates an electrical signal based on the received optical signal without demodulating the optical signal. The second detector measures a performance characteristic of the intensity modulated phase shift keying optical signal based on a signal indicative of the filtered signal.

Technical advantages of the present invention include providing an improved method and system for monitoring performance characteristics of an intensity modulated phase shift keying optical signal. In a particular embodiment, an intensity modulated phase shift keying signal is tapped and an RF spectral frequency component of the signal is determined without demodulating the optical signal. Thus, an optical signal quality may be evaluated without demodulating the optical signal. In this way, monitoring costs are reduced as complex devices for demodulating the PSK signal, such as optical delay interferometer, clock recovery circuit, decision circuit, are not required.

Another technical advantage of the present invention includes providing an improved method and system for intensity modulated phase shift keying optical signals that does not require demodulation of the optical signal. In one embodiment, a tunable optical band pass filter is operable to receive a wavelength division multiplexed (WDM) signal and filter out all but a selected channel for signal quality analysis. In this way, each channel of a WDM signal may be evaluated for signal quality without requiring demodulation of the optical signal or a plurality of performance monitors.

Still another technical advantage of the present invention includes providing an improved method and system for monitoring a performance characteristic of an intensity modulated phase shift keying optical signal that includes an RF electrical filter having multiple pass bands. The pass bands are centered at a plurality of clock signal frequencies. In this way, performance characteristics and signal quality of an IM-mPSK signal whose clock rate corresponds to one of the pass-band frequencies may be monitored.

Other technical advantages of the present invention will be readily apparent to one skilled in the art from the following figures, description, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, wherein like numerals represent like parts, in which.

DETAILED DESCRIPTION

Figure 1:
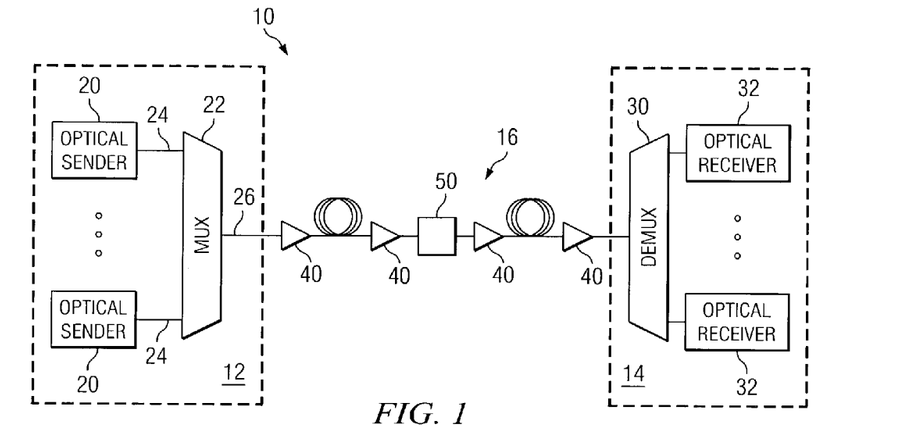
FIG. 1 illustrates an optical communication system using an in-line optical performance monitor in accordance with one embodiment of the present invention.

FIG. 1 illustrates an optical communication system 10 in accordance with one embodiment of the present invention. In this embodiment, the optical communication system 10 is a wavelength division multiplexed (WDM) system in which a number of optical channels are carried over a common path at disparate wavelengths. It will be understood that the optical communication system 10 may comprise a dense wavelength division multiplexed (DWDM) or other suitable multi-channel or bi-directional transmission systems.

Referring to FIG. 1, the WDM system 10 includes a WDM transmitter 12 at a source end point and a WDM receiver 14 at a destination end point coupled together by an optical fiber, or link 16. The optical fiber may be one or more physical fibers or carriers optically coupled together. The WDM transmitter 12 transmits data in a plurality of optical signals, or channels, over the optical link 16 to the remotely located WDM receiver 14.

The WDM transmitter 12 includes a plurality of optical senders 20 and a WDM multiplexer 22. Each optical sender 20 generates an optical information signal 24 on one of a set of distinct wavelengths $\lambda_1, \lambda_2 \ldots \lambda_n$ at the channel spacing. The optical information signals 24 comprise optical signals with at least one characteristic modulated to encode audio, video, textual, real-time, non-real-time or other suitable data. The optical information signals 24 are multiplexed into a single WDM signal 26 by the WDM multiplexer 22 for transmission on the optical link 16. It will be understood that the optical information signals 24 may be otherwise suitably combined into the WDM signal 26. The WDM signal is transmitted as an Intensity Modulated—Phase Shift Keying (IM-mPSK) signal. In WDM systems, different wavelength channels may carry different bitrate signals. For example a first channel may carry 2.4 Gbit/s data while a second channel carries 40 Gbit/s data. The teachings of the invention recognize that in IM-mPSK format, the intensity waveform is cyclic regardless of the modulation data sequence. Corresponding to this periodicity, the RF spectrum after direct detection has a single tone at the clock frequency of any given channel. When the waveform is distorted by the addition of optical noise, chromatic dispersion, polarization mode dispersion, or nonlinear effects, the modulation depth and regularity of the intensity waveform becomes decreased. Therefore, the signal quality can be evaluated by monitoring the RF spectral intensity at the clock frequency.

WDM receiver 14 receives, separates and decodes the optical information signals 24 to recover the included data. In one embodiment, the WDM receiver 14 includes a WDM demultiplexer 30 and a plurality of optical receivers 32. The WDM demultiplexer 30 demultiplexes the optical information signals 24 from the single WDM signal 26 and sends each optical information signal 24 to a corresponding optical receiver 32. Each optical receiver 32 optically or electrically recovers the encoded data from the corresponding signal 24. As used herein, the term "each" means every one of at least a subset of the identified items.

The optical link 16 comprises optical fiber or other suitable medium in which optical signals may be transmitted with low loss and amplified during transmission. Interposed along the optical link 16 are one or more optical amplifiers 40. The optical amplifiers 40 increase the strength, or boost, one or more of the optical information signals 24, and thus the WDM signal 26, without the need for optical-to-electrical conversion. One or more dispersion compensating fibers (DCFs) may also be interposed along the optical link 16.

In one embodiment, the optical amplifiers 40 comprise discrete amplifiers and distributed amplifiers. The discrete amplifiers may comprise rare earth doped fiber amplifiers, such as erbium doped fiber amplifiers (EDFAs), and other suitable amplifiers operable to amplify the WDM signal 26 at a point in the optical link 16. The distributed amplifiers amplify the WDM signal 26 along an extended length of the optical link 16. In one embodiment, the distributed amplifiers comprise bi-directional distributed Raman amplifiers (DRA). Other suitable amplifiers may also be employed. The optical communication system 10 may be designed, implemented, provisioned and/or operated to limit or minimize gain modulation and/or signal distortion of the optical information signals 24 due to forward pumping Raman amplification.

The optical information signals may be intensity or otherwise suitably modulated. For intensity modulation, the carrier signal is modulated into two states, a high value and a low value based on the data signal. As used herein, high value means the modulation state representing a one (1) bit and low value means the modulation state representing a zero (bit). The low value typically equates to a nominal, but non-zero, amplitude, often referred to as "leakage light." The ratio between the high value and the low value is often referred to as the "extinction ratio." Gain modulation of the optical information signals may cause inter-symbol interference (ISI) and cross-talk between channels, degradations that may result in an increase in the bit error rate (BER) of the signal and decreased system performance.

Optical communications system 10 also includes a performance-monitoring module 50. As described in more detail below, performance-monitoring module 50 is operable to tap at least a portion of the optical information signals, convert the optical information signals to one or more electrical signals, and determine a performance characteristic based on the one or more electrical signals. Thus, performance-monitoring module 50 is operable to measure the RF power of the optical information signals without demodulation and therefore, determine an approximation of the bit error rate (BER) associated with the optical information signals. In one embodiment, performance-monitoring module 50 includes an optical coupler, a photodetector, an electrical filter, and an RF power detector. Based on the determined performance characteristics tunable optics such as variable chromatic dispersion compensator, polarization mode dispersion compensator, polarization controller, or variable optical attenuator, within the transmitter 12, in-line node 40, or in the present node 50 may be appropriately tuned. Alternatively, both performance-monitoring module 50 and the tunable optics may be located within receiver 14. Additionally, regeneration of the optical signal may be performed based on the performance characteristics rather than at predetermined locations when the system includes reconfigurable or dynamic optical add-drop multiplexing (OADM) nodes and regenerator pool, so that channels that need regeneration can be dropped, regenerated ad hoc, and added back to the network at the OADM node. This configuration and function may help to reduce the total number of regenerators to be installed to the network and may result in a cost reduction of it. Further, the location along a link 16 at which the signal is degraded beyond acceptable levels may be more easily determined.

Figure 2:
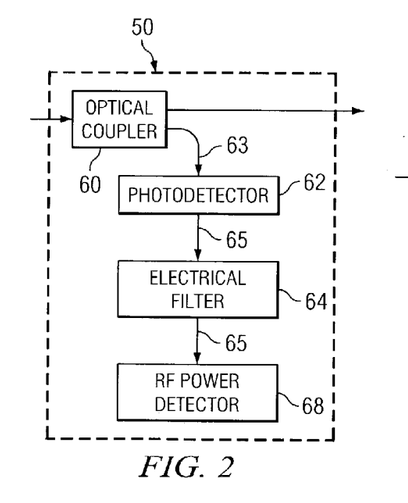
FIG. 2 illustrates the optical performance monitor of FIG. 1, in accordance with one embodiment of the present invention.

FIG. 2 illustrates the performance-monitoring module 50 of FIG. 1 in accordance with one embodiment of the present invention. In particular, performance-monitoring module 50 includes an optical coupler 60, a photodetector 62, an electrical filter 64, and an RF power detector 68. Optical coupler 60 is coupled to photodetector 62 via optical link 63. Photodetector 62, electrical filter 64, and RF power detector 62 are coupled to each other by electrical links 65.

In this embodiment, the performance-monitoring module 50 is operable to determine an RF power of the tapped optical information signal. The RF power allows an analysis of optical signal to noise ratio (OSNR) and waveform distortion. A Q-factor may be calculated based on the OSNR and waveform distortion. The Q-factor may then be used to determine an approximate bit error rate (BER), as the Q-factor theoretically relates directly to the BER on a one-to-one basis. Thus, optical performance-monitoring module 50 allows an in-line approximation of BER without requiring demodulation to intensity modulation, clock recovery, and level thresholding of the underlying to emphasize the merit.

As illustrated, optical coupler 60 also referred to as a splitter, is any device operable to receive an optical signal and to split the optical signal into discrete signals or otherwise passively generate discrete signals based on the received signal. The discrete signals may be identical in form and/or process or may suitably differ. In one embodiment, optical coupler 60 is a coupler operable to tap the optical information signal and provide an optical signal of between 1-5% of the tapped signal to photodetector 62 along optical link 63.

Optical link 63 is any link or other conduit operable to transport an optical signal from a source to a destination. Optical link 63 may comprise a fiber link, a planar waveguide, or other suitable device.

Photodetector 62 is any device operable to receive and measure the provided optical signal and to generate an electrical signal based on the optical signal. The electrical signal indicates or is indicative of the power of the optical information signal. Photodetector 62 is further operable to transmit the electrical signal to electrical filter 64 along electrical link 65.

Electrical link 65 is any link, wire, or other conduit operable to transport an electrical signal from a source to a destination. Electrical link 65 may comprise a bundle of copper wires, a silicon chip with embedded electrical pathways, or other suitable device.

Electrical filter 64 is any device operable to receive the electrical signal from photodetector 62, generate a filtered signal based on the electrical signal, and transmit the filtered signal to RF power detector 68 along electrical link 65. For example, electrical filter 64 may be a band pass filter (BPF) configured to allow only a desired frequency or range of frequencies to pass through the filter. In one embodiment, electrical filter 64 is a BPF with a pass band frequency at a clock frequency of the optical communication system 10 in which performance-monitoring module 50 is employed. Other suitable frequencies or ranges of frequencies may also be employed.

RF power detector 68 is any device operable to receive the filtered signal from electrical filter 64 and determine an RF power based on the filtered signal. RF power detector 68 may also be operable to display, transmit, or otherwise inform a user of the determined RF power. For example, RF power detector 68 may comprise a semiconductor diode, calorimeter, or other suitable detector.

Figure 3:
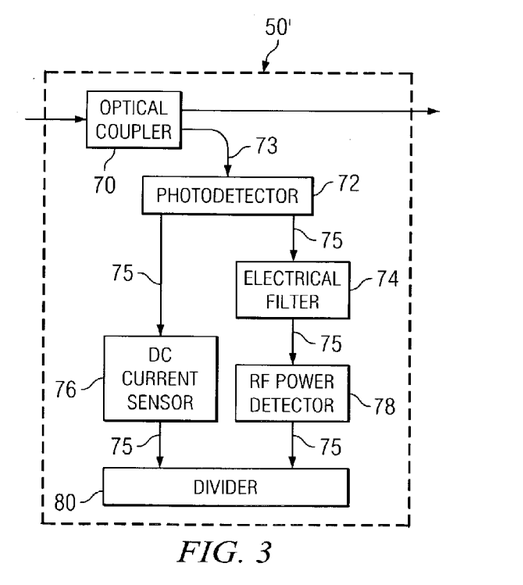
FIG. 3 illustrates the optical performance monitor of FIG. 1, in accordance with another embodiment of the present invention.

FIG. 3 illustrates the performance-monitoring module of FIG. 1 in accordance with another embodiment of the present invention. In particular, performance-monitoring module 50' includes an optical coupler 70, a photodetector 72, an electrical filter 74, an RF power detector 78, a DC current sensor 76, and a divider 80. Optical coupler 70 is coupled to photodetector 72 via optical link 73. Photodetector 72, electrical filter 74, are RF power detector 78, DC current sensor 76, and divider 80 are coupled to each other via electrical links 75.

In this embodiment, performance-monitoring module 50' is operable to determine an RF power of the tapped optical information signal and a DC current of the tapped optical information signal. As described above, the RF power allows an analysis of an optical signal to noise ratio (OSNR) and waveform distortion. Measurement of a DC current of the tapped optical information signal allows for normalizing measurement of the RF power. Thus, performance-monitoring module 50 is more tolerant to deviations in measurement caused by photodetector 72 and/or input optical power fluctuation to the module 50. Moreover, optical performance-monitoring module 50 allows an in-dash line approximation of a bit error rate (BER) without requiring demodulation of the underlying optical information signal.

DC current sensor 76 is operable to receive an electrical signal from photodetector 72 and generate a DC current signal based on the received electrical signal. DC current sensor 76 may be any device operable to measure a DC current of an electrical signal and generate a DC current signal based on the DC current of the received signal.

Divider 80 is operable to receive a DC current signal from DC current sensor 76 and an RF power signal from RF power detector 78. Divider 80 is further operable to generate a signal quality signal based on the received DC current signal and RF power signal. In one embodiment, divider 80 is operable to generate a signal quality signal based on a ratio of the RF power signal to the DC current signal. The signal quality signal generated by divider 80 may be used to identify factors in optical signal degradation such as the optical signal to noise ratio and optical wave form distortion, as described in more detail below in conjunction with FIG. 4 below. Optical coupler 70, photodetector 72, electrical filter 74, and RF power detector 78 may be substantially similar to optical coupler 60, photodetector 62, electrical filter 64, and RF power detector 68, described above.

Figure 4:
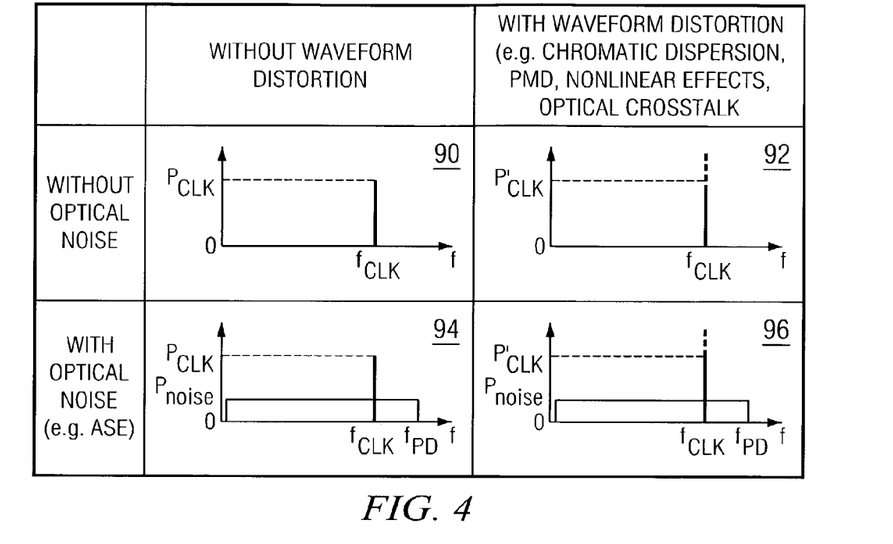
FIG. 4 illustrates a comparison of example spectra for an optical signal in varying states of degradation.

FIG. 4 is a chart illustrating the RF spectra of various intensity modulating phase shift keying signals in accordance with one embodiment of the present invention. As illustrated, block 90 shows an RF spectra of an IM-PSK signal without either waveform distortion or optical noise. It will be understood that the signal quality of block 90 is illustrated only, and not designated to represent an actual power or frecuency of any particular IM-PSK signal; it is intended solely as a reference point to illustrate exemplary uses for the signal quality signal generated by divider 80 of FIG. 3.

Block 92 illustrates an exemplary RF spectra of an IM-PSK signal with waveform distortion and without optical noise. Waveform distortion may be caused by, for example, chromatic dispersion, polarization mode dispersion, non-linear effects, optical cross-talk, and/or any other typical problems associated with optical signal degradation. As illustrated, block 92 shows the optical signal power as somewhat lower than the optical signal as illustrated in block 90 for an RF spectra without waveform distortion or optical noise.

Block 94 illustrates an exemplary RF spectra for an IM-PSK signal with optical noise but without waveform distortion. As illustrated, the RF signal power of the IM-PSK signal is substantially the same as that of an IM-PSK signal without optical noise or wave form distortion. However, a noise power is also detected as illustrated from the frequency range from zero to the cut off frequency of the photodetector. Block 96 illustrates an exemplary RF spectra of an IM-PSK signal with waveform distortion and optical noise. As illustrated, the RF power of the IM-PSK signal is substantially an RF power of an IM-PSK signal without waveform distortion. Also shown by block 96 is a noise component illustrating the presence of optical noise in the tested IM-PSK signal.

Figure 5:
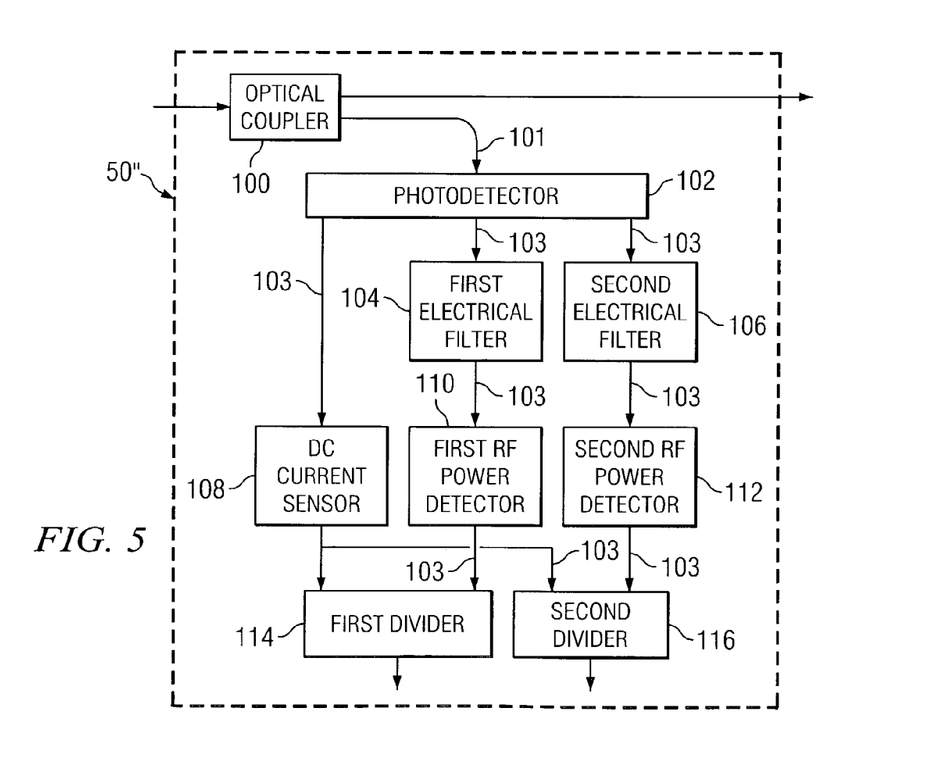
FIG. 5 illustrates the optical performance monitor of FIG. 1, in accordance with another embodiment of the present invention.

FIG. 5 illustrates the performance-monitoring module of FIG. 1 in accordance with another embodiment of the present invention. In particular, performance-monitoring module 50″ includes an optical coupler 100, a photodetector 102, a first electrical filter 104, a second electrical filter 106, a DC current sensor 108, a first RF power detector 110, a second RF power detector 112, a first divider 114 and a second divider 116. Optical coupler 100 is coupled to photodetector via optical link 101. The remaining elements of performance-monitoring module 50″ are coupled to each other via electrical links 103. Components of performance-monitoring module 50″ may be similar to corresponding components of performance-monitoring modules 50 and 50′ described above.

In this embodiment, photodetector 102 has a frequency response that is fast enough compared to the clock frequency of the IM-mPSK signal to be able to monitor the IM-mPSK signal. In one embodiment, first electrical filter 104 is a band pass filter with a pass band centered approximately around the clock frequency of the optical information signal. First electrical filter 104 is operable to receive an electrical signal from fast photodetector 102 and filter the electrical signal to generate a filtered electrical signal and transmit that signal to first RF power detector 110.

Second electrical filter 106 is coupled to fast photodetector 102 and is operable to receive an electrical signal from fast photodetector 102 and filter the electrical signal based on a predetermined cutoff filtering characteristic of the electrical signal. In one embodiment, second electrical filter 106 is a low pass filter operable to allow through a portion of an electrical signal corresponding to a maximum frequency of the electrical signal. Second electrical filter 106 filters the received electrical signal and generates a filtered electrical signal and transmits the filtered electrical signal to second RF power detector 112.

First divider 114 is operable to receive a DC current signal from DC current sensor 108 and a first RF power signal from first RF power detector 110 and to generate a first signal quality signal based on the received DC current signal and first RF power signals. In one embodiment, first divider 114 is operable to generate a signal quality based on a ratio of the first RF power signal to the DC current signal.

Second divider 116 is operable to receive a DC current signal from DC current sensor 108 and a second RF power signal from second RF power detector 112 and to generate a second signal quality signal based on the received DC current signal and second RF power signal. In one embodiment, second divider 116 is operable to generate a second signal quality signal based on a ratio of the DC current signal to the second RF power signal. In this way, second divider 116 is operable to transmit a signal quality signal relevant to the optical signal-to-noise ratio of the tapped optical information signal. In this way, first divider 114 is operable to generate a signal quality signal relevant to the waveform of the tapped optical information signal.

Figure 6:
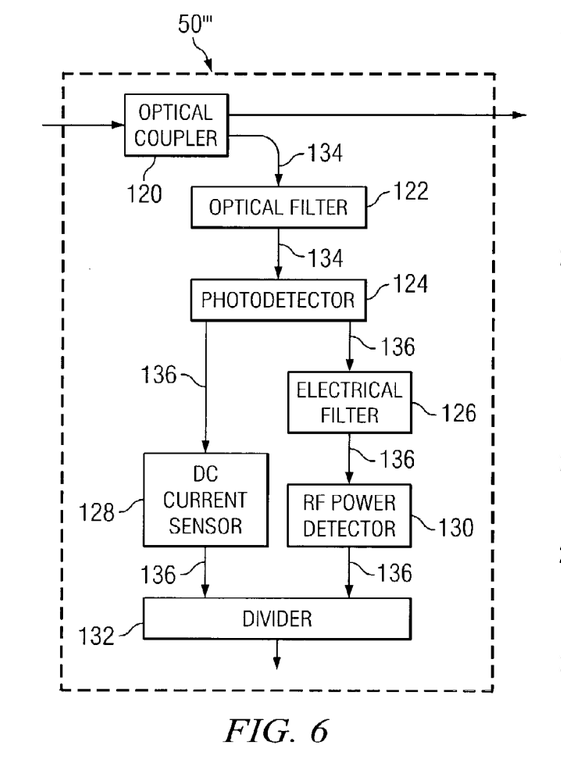
FIG. 6 illustrates the optical performance monitor of FIG. 1, in accordance with another embodiment of the present invention.

FIG. 6 illustrates the performance-monitoring module of FIG. 1 in accordance with another embodiment of the present invention. In particular, performance-monitoring module 50‴ includes an optical coupler 120, an optical filter 122, a photodetector 124, an electrical filter 126, a DC current sensor 128, an RF power detector 130, and a divider 132. Optical filter 122 is coupled to optical coupler 120 via optical link 134. Photodetector 124 is coupled to optical filter 122 via optical link 134. The remaining elements of performance-monitoring module 50 are coupled to each other via electrical links 136. Components of performance-monitoring module 50‴ may be similar to corresponding components of performance-monitoring modules 50, 50′ and 50″, described above.

In this embodiment, photodetector 124 is a fast photodetector. Optical filter 122 is a tunable optical bandpass filter or optical demultiplexer, operable to receive an optical signal and generate a filtered optical signal based on the received optical signal. In one embodiment, optical filter 122 is operable to generate a filtered optical signal based on a channel or wavelength of a multiplexed signal.

In this embodiment, electrical filter 126 is an RF bandpass filter with a pass band centered substantially around a clock frequency of a channel of a multiplexed optical information signal. In another embodiment, electrical filter 126 may be an RF filter having multiple pass bands at a plurality of clock frequencies associated with the multiplexed optical information signal tapped by optical coupler 120.

Figure 7:
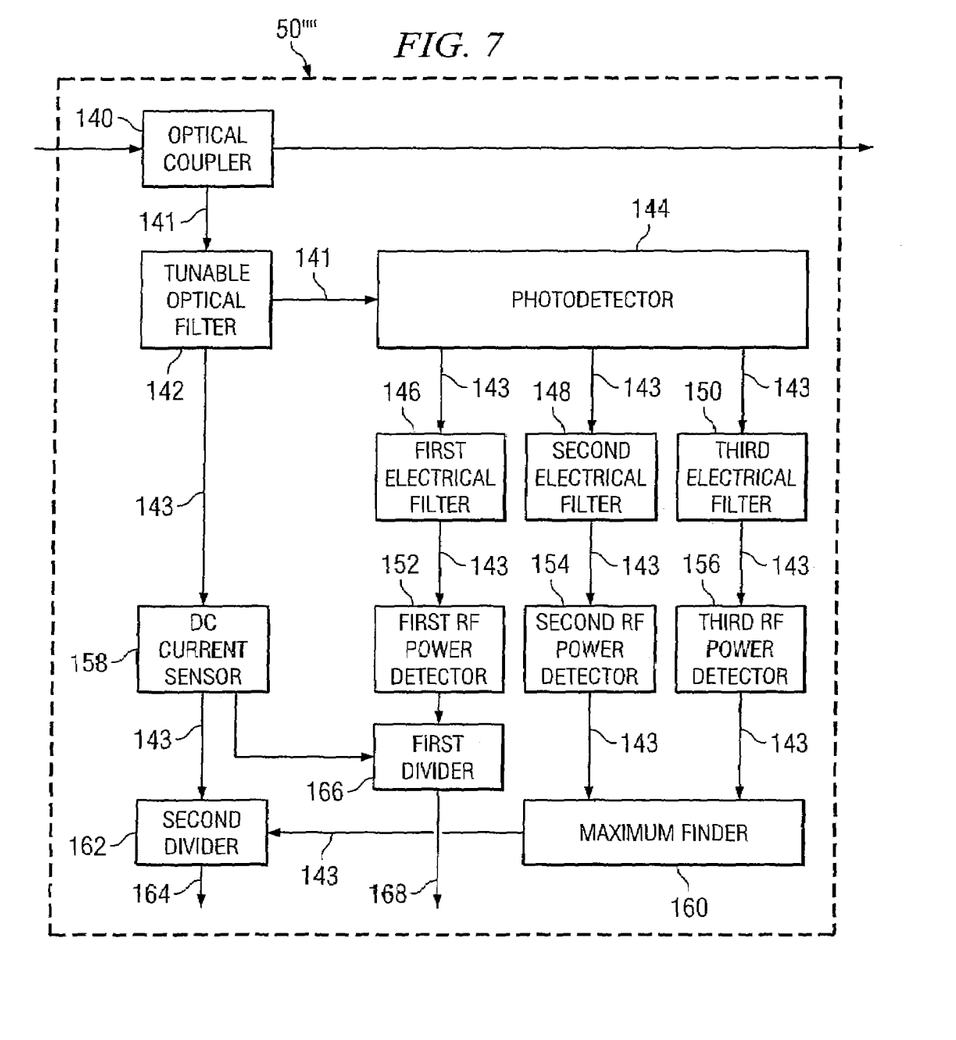
FIG. 7 illustrates the optical performance monitor of FIG. 1, in accordance with another embodiment of the present invention.

FIG. 7 illustrates the performance-monitoring module of FIG. 1 in accordance with another embodiment of the present invention. In particular, performance-monitoring module 50⁗ is designed to accommodate IM-mPSK signals having multiple channels at different clock rates and whose clock rates correspond to one of the monitored passband frequencies. Performance-monitoring module 50⁗ includes an optical coupler 140, a tunable optical filter 142, a photodetector 144, a first electrical filter 146, a second electrical filter 148, a third electrical filter 150, a DC current sensor 158, a first RF power detector 152, a second RF power detector 154, a third RF power detector 156, a divider 162 and a maximum finder 160. Optical coupler 140 is coupled to tunable optical filter 142 via optical link 141, and tunable optical filter 142 is coupled to photodetector 144 via optical link 141. Remaining elements of performance-monitoring module 50⁗ are coupled to each other via electrical links 143. Components of performance-monitoring module 50⁗ may be similar to corresponding components of performance-monitoring modules 50, 50′, 50″, and 50‴ described above.

In this embodiment, photodetector 144 is similar to the photodetector described above in conjunction with FIG. 5. In one embodiment, first electrical filter 146, second electrical filter 148, and third electrical filter 150 are bandpass filters with a passband centered approximately around respective clock frequencies of the optical information signal. Thus performance-monitoring module 50⁗ is particularly suited to determining the signal quality for multiple signals within a IM-mPSK signal, each having a clock rate corresponding to one of the passband frequencies that are monitored. Each of the first, second, and third electrical filters 146, 148 and 150 are operable to receive respective electrical signals from fast photodetector 144 and filter the electrical signal to generate a filtered electrical signal that can transmit that signal to respective RF power detectors 152, 154, or 156. Each of RF power detectors 152, 154, and 156 receives outputs from electrical filters 146, 148, and 150, respectively, and generates an RF power based upon the received filtered electrical signal. The measured RF power is provided to maximum finder 160. Maximum finder 160 determines the maximum RF power of the three provided by RF power detectors 152, 154, and 156 and provides the determined maximum to divider 162. First divider 166 is operable to receive a DC current signal from DC current sensor 158 and an RF power signal from first RF power detector 166 and to generate a first signal quality 168 signal based on the received DC current signal and the received RF power signal. In one embodiment, first divider 166 is operable to generate a signal quality based on a ratio of the received RF power signal to the received DC current signal. The pass band of first electrical filter 146 is set, in one embodiment, so that it does not coincide with any of the clock frequencies. Second divider 162 also receives the output of DC current sensor 158. The maximum power determined by maximum finder 160 is compared to the DC current generated by DC current sensor 158 and determines a signal quality, which is outputted at 164. At the same time, maximum finder 160 can identify which of the multiple clock frequencies has been chosen, which indicates the clock rate and thus the bitrate of the wavelength channel tested.

Figure 8:
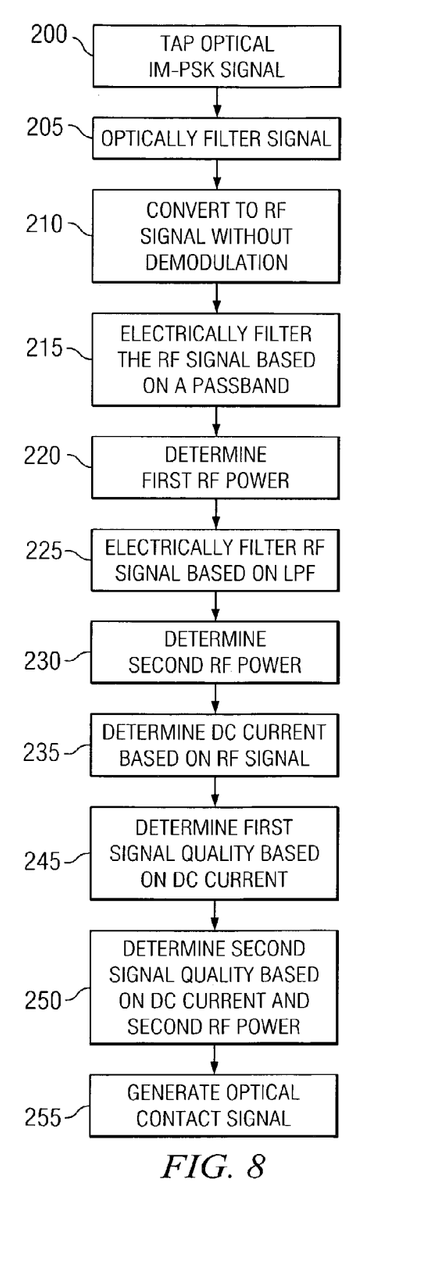
FIG. 8 is a flow diagram illustrating a method for monitoring performance of an optical communication system in accordance with one embodiment of the present invention.

FIG. 8 illustrates a method for monitoring the performance of an optical communication system in accordance with one embodiment of the present invention. The method begins at step 200 wherein an IM-PSK signal is tapped, or a portion thereof. Next at step 205 the tapped optical signal is optically filtered to generate an optically filtered signal. Next at step 210 the optically filtered signal is converted to an RF signal without demodulating the optically filtered signal.

Next at step 215 the RF signal is electrically filtered based on a passband to generate a first electrically filtered signal. Next at step 220 a first RF power is determined based on the first electrically filtered signal.

Next at step 225 the RF signal of step 210 is electrically filtered based on a low end passband to generate a second electrically filtered signal. Next at step 230 a second RF power is determined based on the second electrically filtered signal. Next at step 235 a DC current is determined based on the RF signal of step 210. Next at step 245 a first signal quality is determined based on the DC current determined in step 235 and the first RF power determined in step 220. Next at step 250 a second signal quality is determined based on the DC current determined in step 235 and the second RF power determined in step 230.

Next at step 255 an optical control signal is generated based on the first signal quality determined in step 245 and the second signal quality determined in step 250. The control signal may be then transmitted to tunable optics to provide a feedback mechanism to maintain a desired signal quality.

Although the method of FIG. 8 has been shown with specific steps in a specific order, it will be understood that the steps may be performed in a different order as appropriate, and other steps may be added or omitted as appropriate in keeping with the spirit of the present invention.

Although the present invention has been described with several embodiments, various changes and modifications may be suggested to one skilled in the art. It is intended that the present invention encompass such changes and modifications as fall within the scope of the appended claims. For example, in a design phase of provisioning an optical network, a computer may be used to select parameters or provide alternatives based on programmed logic to meet the conditions of one or more of the embodiments described above and thus provide forward pumping Raman amplification while maintaining limited signal degradation. Thus, a design module may comprise logic embedded in media. The logic comprises functional instructions for carrying out programmed tasks. The media comprises computer disks or other suitable computer-readable media, application specific integrated circuits (ASIC), field programmable gate arrays (FPGA), digital signal processors (DSP), or other suitable specific or general purpose processors, transmission media, or other suitable media in which logic may be encoded and utilized. A computer or computers may also be used in operation of the system 10 to maintain parameters or limits.

What is claimed is:

1. A system for monitoring a performance characteristic of an intensity modulated phase shift keying optical signal, comprising:
   a splitter, operable to receive an intensity modulated phase shift keying optical signal from an optical network and route at least a portion of the signal to a first detector;
   the first detector, coupled to the splitter and operable to receive, the portion of the optical signal and generate an electrical signal based on the received optical signal without demodulation;
   a second detector, operable to receive a signal indicative of the electrical signal, measure a first performance characteristic of the intensity modulated phase shift keying optical signal based on the signal indicative of the electrical signal, and generate a first performance signal based on the first performance characteristic;
   a third detector, coupled to the first detector and operable to receive a second electrical signal from the first detector, measure a second performance characteristic of the intensity modulated phase shift keying optical signal based on the second electrical signal and generate a second performance signal based on the second performance characteristic; and
   a divider, coupled to the second detector and the third detector and operable to receive the first and second performance signals and to measure a third performance characteristic of the intensity modulated phase shift keying optical signal based on the first and second performance signals.

2. The system of claim 1, and further comprising a first filter coupled to the first detector and operable to receive the electrical signal from the first detector and generate a filtered signal that is the signal indicative of the electrical signal.

3. The system of claim 2, wherein the first filter is a band pass filter, operable to allow a range of frequencies centered around a clock frequency of the intensity modulated phase shift keying optical signal.

4. The system of claim 1, wherein the first performance characteristic is an RF power associated with the intensity modulated phase shift keying optical signal.

5. The system of claim 2, wherein the second detector is further operable to generate a first performance signal based on the first performance characteristic; and further comprising:
   a third detector, coupled to the first detector and operable to receive an electrical signal from the first detector, measure a second performance characteristic of the intensity modulated phase shift keying optical signal based on the electrical signal and generate a second performance signal based on the second performance characteristic; and a divider, coupled to the second detector and the third detector and operable to receive the first and second performance signals and to measure a third performance characteristic of the intensity modulated phase shift keying optical signal based on the first and second performance signals.

6. The system of claim 1, wherein the first performance characteristic is an RF power and the second performance characteristic is a direct current.

7. The system of claim 1, wherein the third performance characteristic is a ratio of the first performance characteristic to the second performance characteristic.

8. The system of claim 2, wherein the second detector is further operable to generate a first performance signal based on the first performance characteristic; and further comprising:

a third detector, coupled to the first detector and operable to receive an electrical signal from the first detector, measure a second performance characteristic of the intensity modulated phase shift keying optical signal based on the electrical signal and generate a second performance signal based on the second performance characteristic;

a first divider, coupled to the second detector and the third detector and operable to receive the first and second performance signals and to measure a third performance characteristic of the intensity modulated phase shift keying optical signal based on the first and second performance signals;

a second electrical filter coupled to the first detector and operable to receive an electrical signal from the first detector and generate a second filtered signal based on the electrical signal;

a fourth detector coupled to the second electrical filter and operable to receive a second filtered signal from the second electrical filter, measure a fourth performance characteristic of the intensity modulated phase shift keying optical signal and generate a third performance signal based on the fourth performance characteristic; and a second divider coupled to the third detector and the fourth detector and operable to receive the second and third performance signals and to measure a fifth performance characteristic of the intensity modulated phase shift keying optical signal based on the second and third performance signals.

9. The system of claim 8, wherein the first performance characteristic is an RF power, the second performance characteristic is a direct current, and the third performance characteristic is an RF power.

10. The system of claim 8, wherein the third performance characteristic is a ratio of the first performance characteristic to the second performance characteristic and the fifth performance characteristic is a ratio of the second performance characteristic to the third performance characteristic.

11. The system of claim 8, wherein the second electrical filter is a low pass filter operable to allow frequencies below a predetermined frequency.

12. The system of claim 11, wherein the predetermined frequency is lower than a clock frequency of the intensity modulated phase shift keying optical signal.

13. A system for monitoring a performance characteristic of an intensity modulated phase shift keying optical signal, comprising:

a splitter, operable to receive an intensity modulated phase shift keying optical signal from an optical network and route at least a portion of the signal to a first detector;

a first filter, coupled to the splitter and operable to receive an optical signal and generate a filtered optical signal based on the received optical signal;

a first detector, coupled to the first filter and operable to receive an optical signal and generate an electrical signal based on the received optical signal without demodulation;

a second filter, coupled to the first detector and operable to receive the electrical signal from the first detector and to generate a filtered electrical signal;

a second detector, coupled to the second filter and operable to receive the filtered electrical signal, measure a first performance characteristic of the intensity modulated phase shift keying optical signal based on the filtered electrical signal and generate a first performance signal based on the first performance characteristic;

a third detector, coupled to the first detector and operable to receive the electrical signal from the first detector, measure a second performance characteristic of the intensity modulated phase shift keying optical signal based on the electrical signal and generate a second performance signal based on the second performance characteristic; and a divider, coupled to the second detector and the third detector and operable to receive the first and second performance signals and to measure a third performance characteristic of the intensity modulated phase shift keying optical signal based on the first and second performance signals.

14. The system of claim 13, wherein the first filter is a tunable optical band pass filter, operable to allow a range of wavelengths centered around a wavelength associated with a channel of the intensity modulated phase shift keying optical signal.

15. The system of claim 13, wherein the first filter is an optical demultiplexer, operable to allow a range of wavelengths centered around a wavelength associated with a channel of the intensity modulated phase shift keying optical signal.

16. The system of claim 13, wherein the second filter is a band pass filter, operable to allow a range of frequencies centered around a clock frequency of the intensity modulated phase shift keying optical signal.

17. The system of claim 13, wherein the second filter is a band pass filter, operable to allow a range of frequencies centered around a plurality of disparate clock frequencies associate with the intensity modulated phase shift keying optical signal.

18. The system of claim 13, wherein the first performance characteristic is an RF power and the second performance characteristic is a direct current.

19. The system of claim 13, wherein the third performance characteristic is a ratio of the first performance characteristic to the second performance characteristic.

20. The system of claim 13, wherein the intensity modulated phase shift keying optical signal comprises a plurality of channels operating at different bit rates.

21. The system of claim 13, wherein the intensity modulated phase shift keying optical signal is a multi-bitrate signal.

22. A method for monitoring the performance of an optical communication system, comprising:
tapping an intensity modulated phase shift keying optical signal;
generating a first electrical signal and a second electrical signal based on the tapped optical signal without demodulation of the optical signal;
measuring a first performance characteristic of the intensity modulated phase shift keying optical signal based on a signal indicative of the generated first electrical signal generating a first performance signal based on the first performance characteristic;
measuring a second performance characteristic of the intensity modulated phase shift keying optical signal based on the second electrical signal;
generating a second performance signal based on the second performance characteristic; and
receiving, by a divider, the first and second performance signals and measuring, by the divider, a third performance characteristic of the intensity modulated phase shift keying optical signal based on the first and second performance signals.

23. The method of claim 22, wherein the signal indicative of the first electrical signal is the electrical signal.

24. The method of claim 22, and further comprising filtering the first electrical signal to produce the signal indicative of the electrical signal.

25. The method of claim 22 wherein the performance characteristic is an RF power associated with the intensity modulated phase shift keying optical signal.

26. A method for monitoring the performance characteristic of an optical communication system comprising:
tapping an intensity modulated phase shift keying optical signal from an optical network;
filtering the tapped optical signal to produce a filtered optical signal;
generating an electrical signal based on the filtered optical signal;
filtering the generated electrical signal to produce a filtered electrical signal;
measuring a first performance characteristic of the intensity modulated phase shift keying optical signal based on the filtered electrical signal and generating a first performance signal based on the measured first performance characteristic;
measuring a second performance characteristic of the intensity modulated phase shift keying optical signal based on the generated electrical signal and generating a second performance signal based on the measured second performance characteristic; and
measuring a third performance characteristic of the intensity modulated phase shift keying optical signal based on the first and second performance signals.

27. The method of claim 26, wherein the first performance characteristic is an RF power and the second performance characteristic is a direct current.

28. The method of claim 26, wherein the third performance characteristic is a ratio of the first performance characteristic to the second performance characteristic.

29. The method of claim 26, wherein the intensity modulated phase shift keying optical comprises a plurality of channels operating at different bit rates.

30. The method of claim 26, wherein the intensity modulated phase shift keying optical signal is a multi-bitrate signal.

* * * * *

UNITED STATES PATENT AND TRADEMARK OFFICE
CERTIFICATE OF CORRECTION

| | | |
|---|---|---|
| PATENT NO. | : 7,254,325 B2 | Page 1 of 1 |
| APPLICATION NO. | : 10/430881 | |
| DATED | : August 7, 2007 | |
| INVENTOR(S) | : Takeshi Hoshida | |

It is certified that error appears in the above-identified patent and that said Letters Patent is hereby corrected as shown below:

Col. 9, Ln. 15: After "from first" delete "RF" and insert --RR--;

Col. 10, Ln. 61: Claim 5, After "keying optical signal.", delete:

"5. The system of Claim 2, wherein the second detector is further operable to generate a first performance signal based on the first performance characteristic; and further comprising:

a third detector, coupled to the first detector and operable to receive an electrical signal from the first detector, measure a second performance characteristic of the intensity modulated phase shift keying optical signal based on the electrical signal and generate a second performance signal based on the second performance characteristic; and a divider, coupled to the second detector and the third detector and operable to receive the first and second performance signals and to measure a third performance characteristic of the intensity modulated phase shift keying optical signal based on the first and second performance signals."

Signed and Sealed this
Third Day of July, 2012

David J. Kappos
*Director of the United States Patent and Trademark Office*